United States Patent
Kitchin

(10) Patent No.: US 10,296,463 B2
(45) Date of Patent: May 21, 2019

(54) INSTRUCTION PREFETCHER DYNAMICALLY CONTROLLED BY READILY AVAILABLE PREFETCHER ACCURACY

(71) Applicant: Paul E. Kitchin, Austin, TX (US)

(72) Inventor: Paul E. Kitchin, Austin, TX (US)

(73) Assignee: SAMSUNG ELECTRONICS CO., LTD. (KR)

( * ) Notice: Subject to any disclaimer, the term of this patent is extended or adjusted under 35 U.S.C. 154(b) by 385 days.

(21) Appl. No.: 15/132,230

(22) Filed: Apr. 18, 2016

(65) Prior Publication Data

US 2017/0199739 A1  Jul. 13, 2017

Related U.S. Application Data

(60) Provisional application No. 62/276,067, filed on Jan. 7, 2016.

(51) Int. Cl.
  *G06F 9/38* (2018.01)
  *G06F 12/0875* (2016.01)
  *G06F 12/0862* (2016.01)

(52) U.S. Cl.
  CPC ........ *G06F 12/0875* (2013.01); *G06F 9/3802* (2013.01); *G06F 9/3806* (2013.01); *G06F 12/0862* (2013.01); *G06F 2212/1021* (2013.01); *G06F 2212/452* (2013.01); *G06F 2212/6028* (2013.01)

(58) Field of Classification Search
  CPC ........................... G06F 9/3802; G06F 12/0862
  USPC ................................................. 712/207, 237
  See application file for complete search history.

(56) References Cited

U.S. PATENT DOCUMENTS

| | | | | |
|---|---|---|---|---|
| 5,553,255 A | * | 9/1996 | Jain | G06F 9/3804 711/204 |
| 5,721,864 A | * | 2/1998 | Chiarot | G06F 9/3802 711/137 |
| 5,774,685 A | * | 6/1998 | Dubey | G06F 9/383 711/122 |
| 6,012,134 A | * | 1/2000 | McInerney | G06F 9/3802 711/141 |
| 6,324,616 B2 | * | 11/2001 | Chrysos | G06F 9/3802 710/116 |
| 6,560,693 B1 | * | 5/2003 | Puzak | G06F 9/383 712/205 |
| 6,732,260 B1 | * | 5/2004 | Wang | G06F 9/3806 712/207 |
| 7,076,640 B2 | | 7/2006 | Kadambi | |
| 7,085,916 B1 | * | 8/2006 | Nguyen | G06F 9/3804 712/207 |
| 7,587,580 B2 | * | 9/2009 | Sartorius | G06F 9/3804 712/207 |

(Continued)

*Primary Examiner* — Yuqing Xiao
(74) *Attorney, Agent, or Firm* — Renaissance IP Law Group LLP

(57) ABSTRACT

According to one general aspect, an apparatus may include a branch prediction unit, a fetch unit, and a pre-fetch circuit or unit. The branch prediction unit may be configured to output a predicted instruction. The fetch unit may be configured to fetch a next instruction from a cache memory. The pre-fetcher circuit may be configured to pre-fetch a previously predicted instruction into the cache memory based upon a relationship between the predicted instruction and the next instruction.

18 Claims, 4 Drawing Sheets

(56) References Cited

U.S. PATENT DOCUMENTS

| | | | | |
|---|---|---|---|---|
| 7,627,742 B2* | 12/2009 | Bose | G06F 1/3203 | |
| | | | 712/205 | |
| 7,962,724 B1* | 6/2011 | Ali | G06F 9/3802 | |
| | | | 712/207 | |
| 8,176,297 B2* | 5/2012 | Yamamoto | G06F 9/3802 | |
| | | | 712/205 | |
| 8,443,176 B2* | 5/2013 | Sonnelitter, III | G06F 9/30058 | |
| | | | 712/237 | |
| 8,516,226 B1 | 8/2013 | Collard et al. | | |
| 9,182,991 B2* | 11/2015 | Buyuktosunoglu | G06F 9/3851 | |
| 9,477,479 B2* | 10/2016 | Greenhalgh | G06F 9/3806 | |
| 9,811,341 B2* | 11/2017 | Stavrou | G06F 9/3804 | |
| 9,946,546 B2* | 4/2018 | Yamashita | G06F 9/3806 | |
| 2002/0099926 A1* | 7/2002 | Sinharoy | G06F 9/3804 | |
| | | | 712/207 | |
| 2003/0110365 A1* | 6/2003 | Suetake | G06F 9/3802 | |
| | | | 712/207 | |
| 2004/0172518 A1* | 9/2004 | Saruwatari | G06F 9/3804 | |
| | | | 712/207 | |
| 2005/0027921 A1* | 2/2005 | Hirotsu | G06F 9/3802 | |
| | | | 711/1 | |
| 2006/0242365 A1* | 10/2006 | Ali | G06F 9/3804 | |
| | | | 711/137 | |
| 2008/0034187 A1* | 2/2008 | Stempel | G06F 9/3804 | |
| | | | 712/205 | |
| 2008/0256345 A1* | 10/2008 | Bose | G06F 1/3203 | |
| | | | 712/239 | |
| 2009/0210663 A1* | 8/2009 | Sartorius | G06F 9/3804 | |
| | | | 712/207 | |
| 2012/0124345 A1* | 5/2012 | Denman | G06F 9/3844 | |
| | | | 712/237 | |
| 2014/0173217 A1 | 6/2014 | Kalamatianos et al. | | |
| 2014/0344558 A1 | 11/2014 | Holman et al. | | |
| 2015/0089186 A1 | 3/2015 | Kim et al. | | |
| 2015/0277911 A1 | 10/2015 | Khartikov et al. | | |
| 2015/0277925 A1 | 10/2015 | Sleiman et al. | | |
| 2015/0277975 A1 | 10/2015 | Kelm et al. | | |
| 2016/0253178 A1* | 9/2016 | Yamashita | G06F 9/3806 | |
| | | | 712/206 | |

* cited by examiner

INSTRUCTION PREFETCHER DYNAMICALLY CONTROLLED BY READILY AVAILABLE PREFETCHER ACCURACY

CROSS-REFERENCE TO RELATED APPLICATION

This application claims priority under 35 U.S.C. § 119 to Provisional Patent Application Ser. No. 62/276,067, entitled "INSTRUCTION PREFETCHER DYNAMICALLY CONTROLLED BY READILY AVAILABLE PREFETCHER ACCURACY" filed on Jan. 7, 2016. The subject matter of this earlier filed application is hereby incorporated by reference.

TECHNICAL FIELD

This description relates to prefetching data, and more specifically to controlling the prefetching of instructions.

BACKGROUND

In computer architecture, instruction prefetching is a technique used to speed up the execution of a program by reducing wait states. Prefetching generally occurs when a processor or a sub-unit of a processor (e.g., a pre-fetch unit) requests an instruction or data block from a main memory before it is actually needed. Once the instruction/data block comes back from the main or system memory, the instruction/data block is typically placed in a cache. When a request is made to access the instruction/data block from the cache, the instruction/data block can be accessed much more quickly from the cache than if a request had to be made from the main or system memory. Thus, prefetching hides memory access latency.

Since programs are generally executed sequentially, performance is likely to be best when instructions are pre-fetched in program order. Alternatively, the pre-fetch may be part of a complex branch prediction algorithm, where the processor tries to anticipate the result of a calculation and fetch the right instructions in advance.

In computer architecture, a branch predictor or branch prediction unit is a digital circuit that attempts to guess which way a branch (e.g. an if-then-else structure, a jump instruction) will go before the result is actually computed and known. The purpose of the branch predictor is generally to improve the flow in the instruction pipeline. Branch predictors play a critical role in achieving high effective performance in many modern pipelined microprocessor architectures.

Two-way branching is usually implemented with a conditional jump instruction. A conditional jump can either be "not taken" and continue execution with the first branch of code which follows immediately after the conditional jump, or it can be "taken" and jump to a different place in program memory where the second branch of code is stored. It is often not known for certain whether a conditional jump will be taken or not taken until the condition has been calculated and the conditional jump has passed the execution stage in the instruction pipeline.

Without branch prediction, the processor typically would have to wait until the conditional jump instruction has passed the execute stage before the next instruction can enter the fetch stage in the pipeline. The branch predictor attempts to avoid this waste of time by trying to guess whether the conditional jump is most likely to be taken or not taken. The branch that is guessed to be the most likely is then fetched and speculatively executed. If the branch predictor detects that the guessed branch is wrong, the speculatively executed or partially executed instructions are often discarded and the pipeline starts over with the correct branch, incurring a delay.

SUMMARY

According to one general aspect, an apparatus mat include a branch prediction unit, a fetch unit, and a pre-fetch circuit or unit. The branch prediction unit may be configured to output a predicted instruction. The fetch unit may be configured to fetch a next instruction from a cache memory. The pre-fetcher circuit may be configured to pre-fetch a previously predicted instruction into the cache memory based upon a relationship between the predicted instruction and the next instruction.

According to another general aspect, a method may include predicting, by a prediction circuit, that a predicted instruction will be executed by a processor. The method may include fetching, by a fetching circuit, a next instruction from a cache memory. The method may also include determining if a relationship between the predicted instruction and the next instruction meet a set of one or more predefined criteria. The method may include if so, pre-fetching the predicted instruction into the cache memory.

According to another general aspect, an apparatus may include a processor, a cache memory, a branch prediction unit, a fetch unit, and a pre-fetcher circuit or unit. The processor may be configured to execute instructions. The cache memory may be configured to temporarily store instructions. The branch prediction unit may be configured to output a predicted instruction, wherein the predicted instruction is speculatively predicted to be executed by the processor, and wherein the branch prediction unit is decoupled from a fetch unit. The fetch unit may be configured to fetch a next instruction from a cache memory. The pre-fetcher circuit may be configured to, in response to a relationship between the predicted instruction and the next instruction meeting one or more predefined criteria, pre-fetch a previously predicted instruction into the cache memory.

The details of one or more implementations are set forth in the accompanying drawings and the description below. Other features will be apparent from the description and drawings, and from the claims.

A system and/or method for prefetching data, and more specifically to controlling the prefetching of instructions, substantially as shown in and/or described in connection with at least one of the figures, as set forth more completely in the claims.

BRIEF DESCRIPTION OF THE DRAWINGS

Like reference symbols in the various drawings indicate like elements.

DETAILED DESCRIPTION

Figure 1:
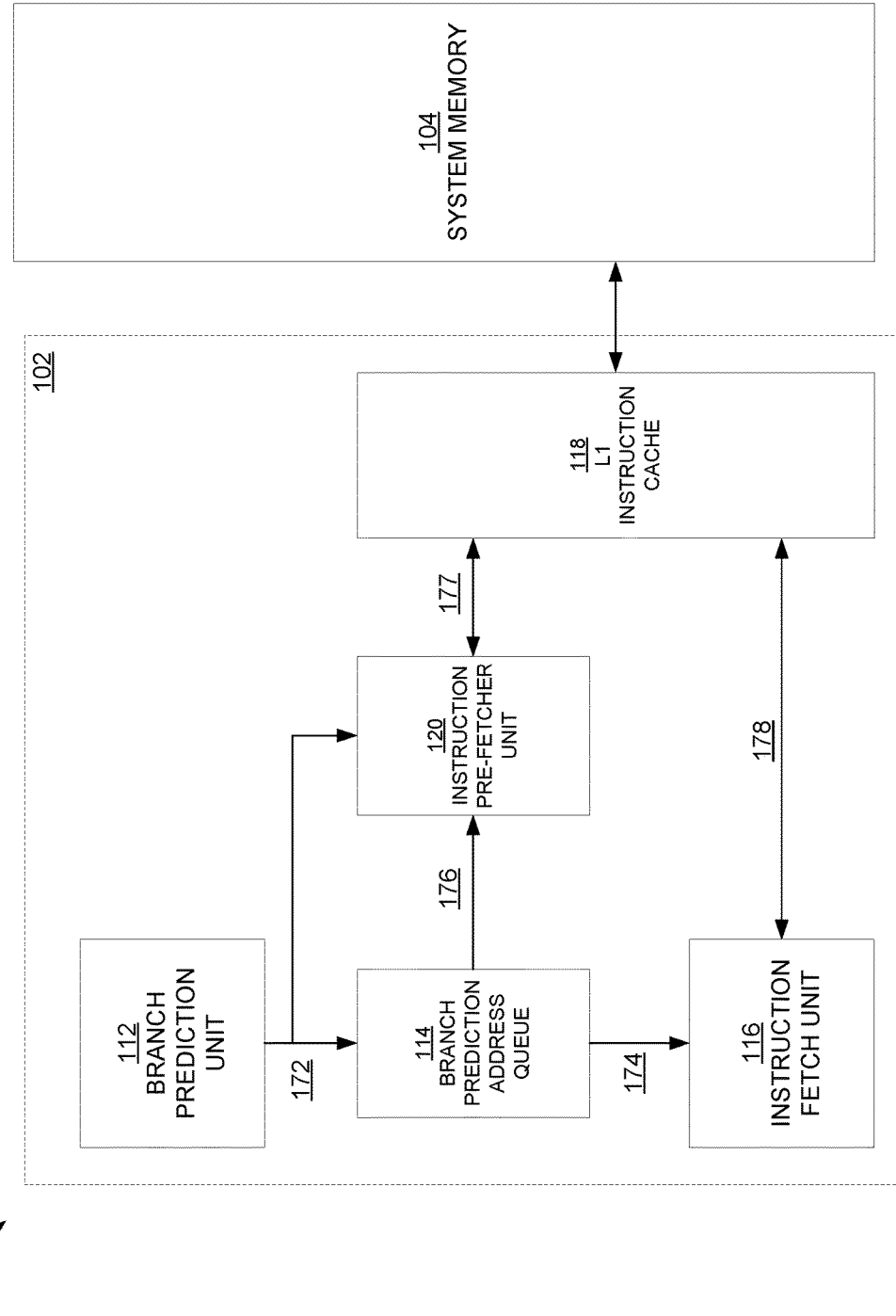
FIG. 1 is a block diagram of an example embodiment of a system in accordance with the disclosed subject matter.

Various example embodiments will be described more fully hereinafter with reference to the accompanying drawings, in which some example embodiments are shown. The present disclosed subject matter may, however, be embodied in many different forms and should not be construed as limited to the example embodiments set forth herein. Rather, these example embodiments are provided so that this disclosure will be thorough and complete, and will fully convey the scope of the present disclosed subject matter to those skilled in the art. In the drawings, the sizes and relative sizes of layers and regions may be exaggerated for clarity.

It will be understood that when an element or layer is referred to as being "on," "connected to" or "coupled to" another element or layer, it may be directly on, connected or coupled to the other element or layer or intervening elements or layers may be present. In contrast, when an element is referred to as being "directly on", "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, and so on may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present disclosed subject matter.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" may encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosed subject matter.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

FIG. 1 is a block diagram of an example embodiment of a system 100 in accordance with the disclosed subject matter. In various embodiments, the system 100 may include a computer, a number of discrete integrated circuits, or a system-on-a-chip (SoC). As described below, the system 100 may include a number of other components that are not illustrated in this figure in order to not obscure the disclosed subject matter.

In the illustrated embodiment, the system 100 includes a system or main memory 104. In various embodiments, the system memory 104 may be made up of dynamic random access memory (DRAM). Although, it is understood that the above is merely one illustrative example to which the disclosed subject matter is not limited. In such an embodiment, the system memory 104 may include memory on modules (e.g., dual in-line memory modules (DIMMs)), may be integrated chips that are soldered or otherwise fixedly integrated with the system 100, or may even be incorporated as part of an integrated chip that includes the system 100 (e.g., a SoC). It is understood that the above are merely a few illustrative examples to which the disclosed subject matter is not limited.

In the illustrated embodiment, the system memory 104 may be configured to store pieces of data or information. These pieces of data may include instructions that cause a processor 102 to perform various operations. In general the system memory 104 may be part of a larger memory hierarchy that includes a number of caches. In various embodiments, the operations described herein may be performed by another layer or tier of that memory hierarchy (e.g., a level 2 (L2) cache). It is understood by one skilled in the art that the while the operations described in reference to the system memory 104 that the disclosed subject matter is not limited to this illustrative example.

In the illustrated embodiment, the system 100 also includes the processor 102. The processor 102 may be configured to perform a plurality of operations as dictated by various instructions. These instructions may be executed by various executions units (mostly not shown), such as, arithmetic logic units (ALUs), floating point units (FPUs), load/ store units (LSUs), an instruction fetch unit 116 (IFU), and so on. It is understood that a unit is simply a collection of electrical circuits grouped together to perform a portion of the processor 102's functions. Typically a unit performs one or more operations in the processor 102's pipelined architecture.

In the illustrated embodiment, the processor 102 may include a branch prediction unit (BPU) or circuit 112. As described above, as the processor 102 is executing a stream of instructions, one (or more) of the instructions may be a branch instruction. A branch instruction is one that causes the stream of instructions to branch or fork between one of two or more paths. The typical example of a branching instruction is an if-then structure, in which if a certain condition is met (e.g., the user clicks an "OK" button) a first set of instructions will be performed, and if the certain condition is not met (e.g., the user clicks a "Cancel" button) a second set of instructions will be performed. As described above, this is a problem in pipelined processor architectures because new instructions must enter the processor 102's pipeline before the result of the branch, jump, or if-then structure are known (as the pipeline stage in which the branch instruction is resolved is deep in the pipeline). Therefore, new instructions must be prevented from entering the pipeline until the branch instruction is resolved (thus negating the main advantage of a pipelined architecture) or the processor 102 must make a guess as to which way the stream of instructions will branch and speculatively put those instructions in the pipeline. The BPU 112 may be configured to predict how the stream of instructions will branch. In the illustrated embodiment, BPU 112 may be configured to output a predicted instruction 172 or, more accurately, output a memory address where the predicted instruction 172 is stored.

In the illustrated embodiment, the processor 102 includes a branch prediction address queue (BPAQ) 114. The BPAQ 114 may include a memory structure configured to store a plurality of addresses for predicted instructions 172 that has been predicted by the BPU 112. The BPAQ 114 may store the addresses of these predicted instructions 172 in a first-in-first-out (FIFO) order such that instruction addresses are output from the BPAQ 114 in the same order in which the BPU 112 predicted them.

In the illustrated embodiment, the processor 102 includes an instruction fetch unit (IFU) 116 configured to fetch instructions from the memory hierarchy and place them in the processor 102's pipeline. In such an embodiment, the IFU 116 may be configured to take the memory address associated with the least recent or oldest instruction (the next instruction 174) from the BPAQ 114, and request the actual instruction 174 from the memory hierarchy. Ideally the instruction 174 will quickly be provided from the memory hierarchy and placed into the processor 102's pipeline.

In the illustrated embodiment, the BPAQ 114 is configured to decouple the BPU 112 from the IFU 116. In such an embodiment, the BPU 112 predicts instructions 172 at a different rate (e.g., faster) than the IFU 116 consume them. In a coupled or unbuffered architecture or embodiment, the IFU 116 may be required to fetch predicted instructions as quickly as the BPU 112 predicts them. In the illustrated embodiment, the IFU 116 may experience delays (e.g., cache misses, pipeline stalls, and so on) and not impact the BPU 112, as any additional addresses of predicted instructions172 produced by the BPU 112 may simply be stored in the BPAQ 114. When the IFU 116 is able to resume consumption of addresses of new instructions 174 they will be waiting in the BPAQ 114.

Returning to the IFU 116's fetching mechanism, ideally the instruction 174 may be fetched from the level 1 (L1) instruction cache 118 (via the memory access(es) 178). In such an embodiment, as a top or higher tier of the memory hierarchy the L1 instruction cache 118 may be relatively quick and incur little or no delays in the pipeline. However, occasionally the L1 instruction cache 118 may not include the desired instruction 174. This will result in a cache miss, and the instruction will have to be fetched or loaded from a lower, slower tier of the memory hierarchy (e.g., system memory 104). Such a cache miss may cause a delay in the processor 102's pipeline as instructions will not be input into the pipeline at a rate of one pre cycle (or whatever the maximum rate in the processor's architecture).

In the illustrated embodiment, the processor 102 includes an instruction pre-fetcher unit (IPFU) 120. The IPFU 120 is configured to pre-fetch instructions into the L1 instruction cache 118 before the IFU 116 performs the actual fetching operation. Thus, the IPFU 120 reduces the occurrences of any cache misses experienced by the IFU 116. The IPFU 120 may do this by requesting predicted instructions 172 from the L1 instruction cache 118 before the IFU 116 does. In such an embodiment, if a cache miss then occurs, the L1 instruction cache 118 will begin the process of requesting the missed instruction from the system memory 104. In such an embodiment, the instruction may be received and stored in the L1 instruction cache 118 by the time the IFU 116 requests it.

In various embodiments, because one of the IPFU 120's purposes is to make sure the L1 instruction cache 118 is pre-loaded with any desired instructions and not to actually make use of the instructions themselves, the IPFU 120 may throw away any returned instructions 172 or may not include the structures to actually receive the instruction 172. For example, the signals 177 between the IPFU 120 and the cache memory 118 may include the control signals needed to request memory accesses and receive any status updates regarding those requests (e.g., whether there was a cache miss, whether the request was fulfilled), but may not include the data lines or signals that would carry the actual data requested by the memory access (e.g., the values making up the instructions 172 themselves). It is understood that the above is merely one illustrative example to which the disclosed subject matter is not limited.

In the illustrated embodiment, the IPFU 120 may be configured to only pre-fetch a predicted instruction 172 if a certain relationship exists between the predicted instruction 172 (issued by the BPU 112) and the next instruction 174 (fetched by the IFU 116). In various embodiments, the relationship between the two instructions 172 and 174 may be a measure of how speculative the prediction by the BPU 112 is. For example, if the BPU 112 is unsure of the correctness of its prediction, the IPFU 120 may not wish to pre-fetch the predicted instruction 172.

In various embodiments, pre-fetching an incorrectly predicted instruction 172 may have undesirable effects. For example, if an incorrectly predicted instruction 172 is fetched and placed in the pipeline, it will later have to be flushed and any computed results will have to be undone, causing a costly maneuver for the processor 102. Additionally, any instructions that are loaded into the L1 cache 118 but are never fetched or used may cause cache pollution. Cache pollution is generally when unused or unwanted data fills up the limited space of a cache, evicting data that may be desired or is usable. It is understood that the above are merely a few illustrative examples to which the disclosed subject matter is not limited.

In some embodiments, the BPU 112 may indicate to the IPFU 120 how speculative the predicted instruction 172 is. However, in the illustrated embodiment, the level of speculation may be inferred from the readily available information found within the BPAQ 114 (illustrated by signal 176). In such an embodiment, the relationship between the predicted instruction 172 and the next instruction 174 may be their distance from one another with respect to their respective addresses in the BPAQ 114 or the current depth of the BPAQ 114. In such an embodiment, the further behind the IFU 116 is the more speculative the predicted instructions 172 become. In various embodiments, if the distance exceeds a predefined threshold value (discussed in FIG. 2), the IPFU 120 may throttle or refrain from any pre-fetching activities. Whereas, if the depth is below the threshold value, the IPFU 120 may pre-fetch the predicted instruction 172. It is understood that the above is merely one illustrative example to which the disclosed subject matter is not limited.

In one embodiment, if the IPFU 120 has throttled pre-fetching and then later un-throttles or resumes it, the IPFU 120 may be configured to resume pre-fetching beginning at whatever instruction had been previously predicted when the throttling begin, such that all instructions (as long as they are in the BPAQ 114) are pre-fetched. In another embodiment, the IPFU 120 may simply not pre-fetch any predicted instructions 172 that were issued by the BPU 112 during the throttling period, and instead begin or resume pre-fetching as new addresses of predicted instructions 172 are output by the BPU 112. In such an embodiment, it may be the responsibility of the IFU 116 to fetch the missed instructions even if they were not pre-fetched. It is understood that the above are merely a few illustrative examples to which the disclosed subject matter is not limited.

Figure 2:
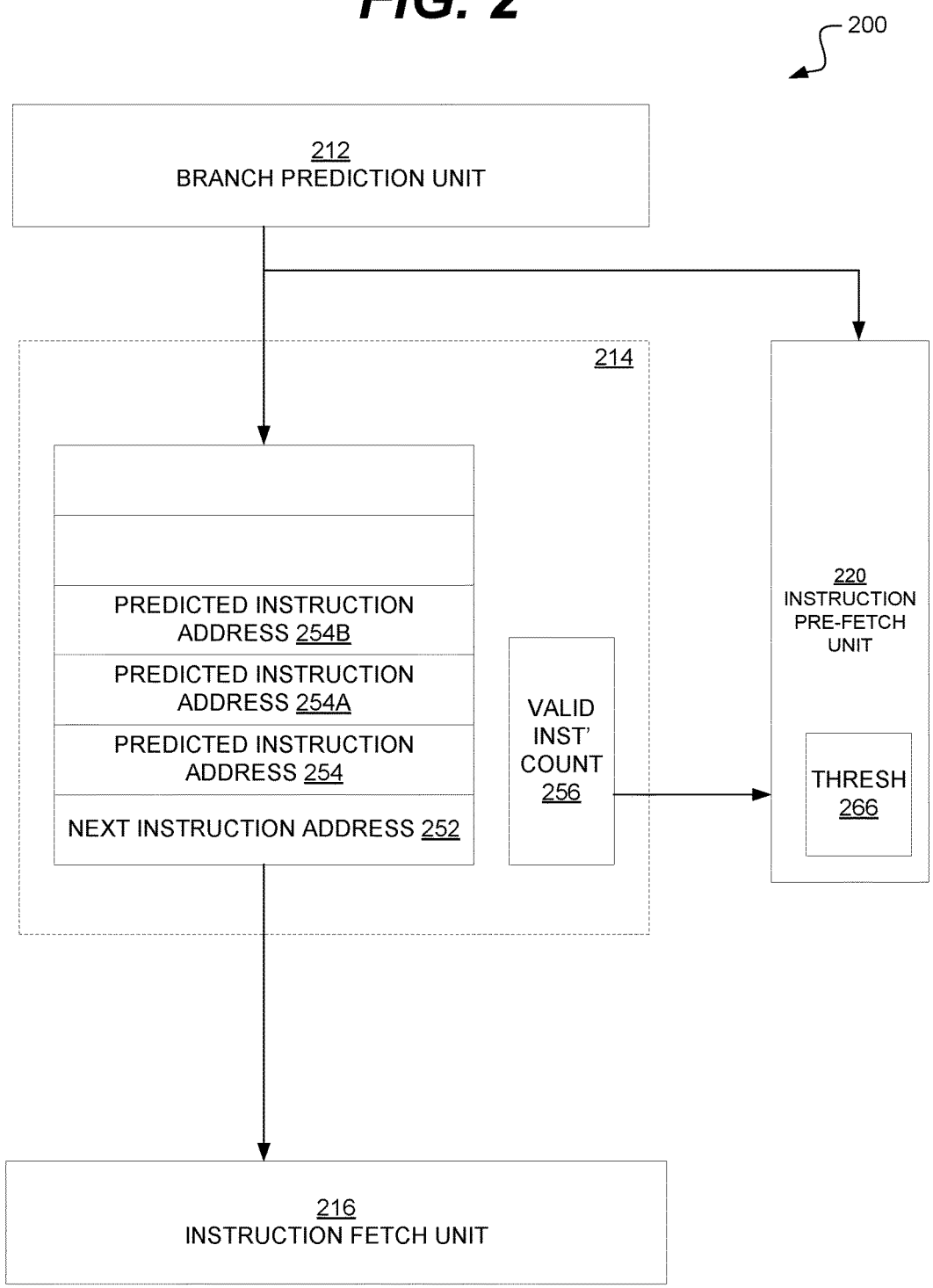
FIG. 2 is a block diagram of an example embodiment of an apparatus in accordance with the disclosed subject matter.

FIG. 2 is a block diagram of an example embodiment of an apparatus 200 in accordance with the disclosed subject matter. In various embodiments, the apparatus 200 may be part of a processor, as described above. In some embodiments, the apparatus 200 may be part of a greater or unified instruction fetch and pre-fetch unit that is configured to predict, pre-fetch, and ultimately fetch instructions for execution by the processor. In another embodiment, the elements described herein may be discrete. It is understood that the above are merely a few illustrative examples to which the disclosed subject matter is not limited.

In the illustrated embodiment, the apparatus 200 includes a branch prediction unit (BPU) 212. In the illustrated embodiment, the apparatus 200 includes an instruction fetch unit (IFU) 216. The apparatus 200 further includes an instruction pre-fetch unit IPFU) 220 and a branch prediction address queue (BPAQ) 214.

In the illustrated embodiment, the internals of the BPAQ 214 are highlighted and overtly shown. Specifically, six queue entries or fields are shown; although, it is understood that the above is merely one illustrative example to which the disclosed subject matter is not limited. As the BPU 212 outputs predicted instructions or more specifically the memory addresses of the predicted instructions, they may be enqueued within the BPAQ 214 in a FIFO manner. In the illustrated embodiment, there are four instruction addresses enqueued within the BPAQ 214: addresses of predicted instructions 254b, 254a, 254, and an address of a next instruction 252. The oldest predicted instruction is referred to as the next instruction 252 as it is the next instruction to be processed by the IFU 216 (assuming no unusual event, such as pipeline flush, occurs).

In the illustrated embodiment, the BPAQ 214 maintains a valid instruction count value (VIC) 256. In such an embodiment, the VIC 256 may simply be a count of the number of addresses of predicted instructions currently stored by the BPAQ 214 (four in the illustrated example). In some embodiments, it may be the index of the most recent entry into the array of instruction addresses (predicted instruction 254b). In another embodiment, the VIC 256 may be the difference between the index of the address of the next instruction 252 and the address of the most recent predicted instruction 254b. It is understood that the above are merely a few illustrative examples to which the disclosed subject matter is not limited.

In such an embodiment, the VIC 256 is provided to the IPFU 220. The IPFU 220 receives the VIC 256 as an indicator of the level of speculation or level of confidence associated with the most recent predicted instruction 254b. In the illustrated embodiment, the IPFU 220 may compare the VIC 256 to a threshold value 266 (stored by the IPFU 220). If the VIC 256 is lower that the threshold value 266, the IPFU 220 may pre-fetch the most recent predicted instruction 254b. If the VIC is greater or equal to the threshold value 266, the IPFU 220 may throttle or otherwise refrain from pre-fetching the most recent predicted instruction 254b. In such an embodiment, the IPFU 220 may be configured to halt any pre-fetching if the level of speculation associated with the most recent predicted instruction 254b is too high, or the level of confidence is too low. It is understood that the above is merely one illustrative example to which the disclosed subject matter is not limited, and that in other embodiments throttling may be based if the VIC is less than the threshold, or any other comparison mechanism, such as a sliding comparison. It is understood that the above are merely a few illustrative examples to which the disclosed subject matter is not limited.

In various embodiments, the threshold 266 may be dynamically adjusted. However, in the illustrated embodiment, the threshold 266 may be a static, predefined value. In one embodiment, the threshold 266 may include a value of 2; although, it is understood that the above is merely one illustrative example to which the disclosed subject matter is not limited.

Figure 3:
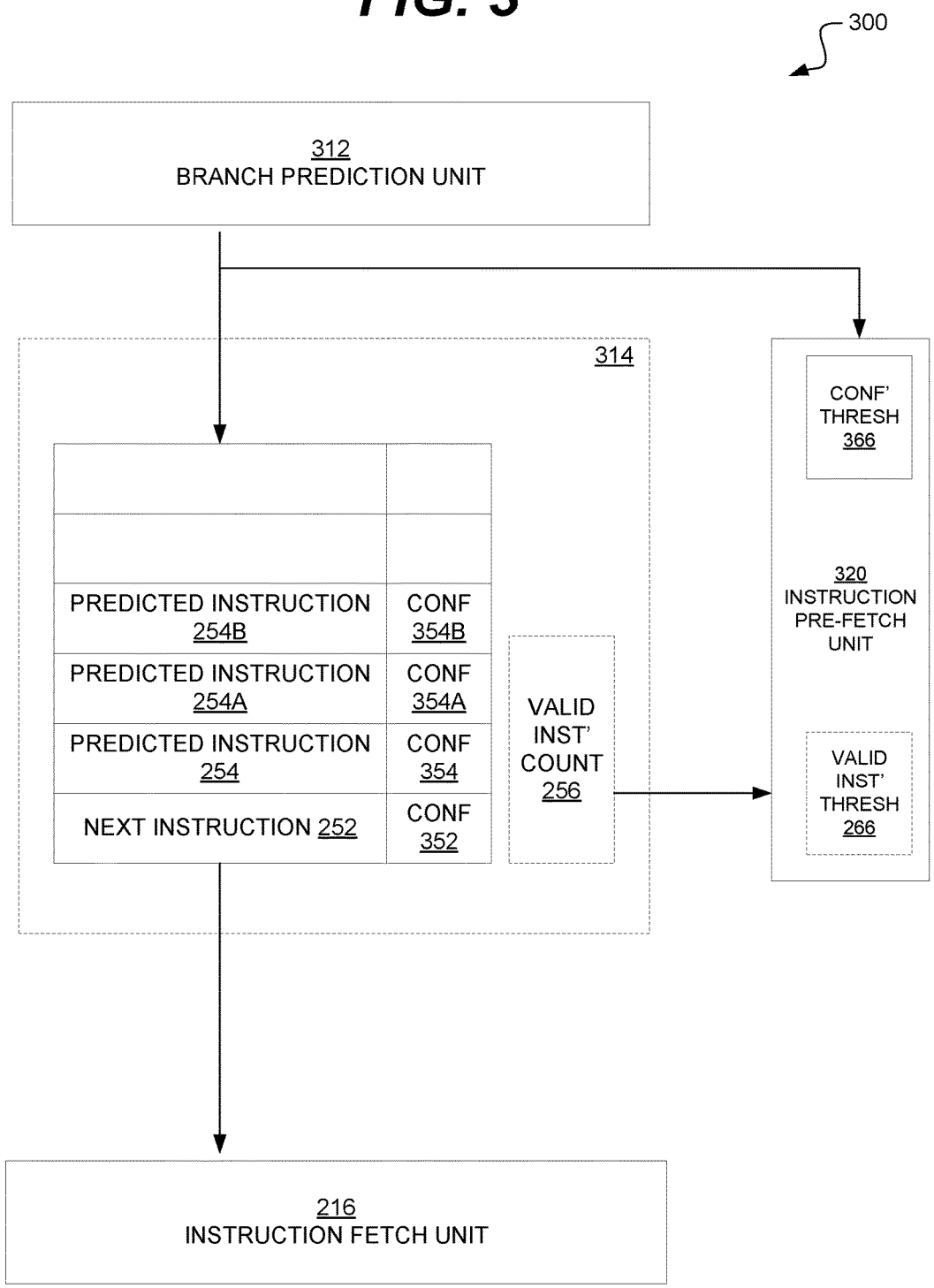
FIG. 3 is a block diagram of an example embodiment of an apparatus in accordance with the disclosed subject matter.

FIG. 3 is a block diagram of an example embodiment of an apparatus 300 in accordance with the disclosed subject matter. In various embodiments, the apparatus 300 may be part of a processor, as described above. In some embodiments, the apparatus 300 may be part of a greater or unified instruction fetch and pre-fetch unit that is configured to predict, pre-fetch, and ultimately fetch instructions for execution by the processor. In another embodiment, the elements described herein may be discrete. It is understood that the above are merely a few illustrative examples to which the disclosed subject matter is not limited.

In the illustrated embodiment, the apparatus 300 includes a branch prediction unit (BPU) 312. In the illustrated embodiment, the apparatus 300 includes an instruction fetch unit (IFU) 216, an instruction pre-fetch unit (IPFU) 320 and a branch prediction address queue (BPAQ) 314.

The BPAQ 314 illustrates six queue entries or fields; although, it is understood that the above is merely one illustrative example to which the disclosed subject matter is not limited. As the BPU 312 outputs predicted instructions or more specifically the memory addresses of the predicted instructions, they may be enqueued within the BPAQ 314 in a FIFO manner. In the illustrated embodiment, there are four instruction addresses currently enqueued within the BPAQ 314: predicted instructions 245b, 254a, 254, and next instruction 252.

In the illustrated embodiment, the BPU 312 outputs confidence levels 354b, 354a, 354, and 352 that are respectively associated with the addresses of predicted instructions 254b, 254a, 254, and the next instruction 252. The confidence levels 354b, 354a, 354, and 352 may indicate the BPU 320's level of confidence or speculation that the predicted instruction will actually be executed by the processor.

In some embodiments, the confidence levels 354b, 354a, 354, and 352 may be binary and indicate whether there is any speculation at all in the prediction. For example, if an unresolved branch instruction has not been encountered in the stream of instructions, all of the instructions in the stream will certainly be taken (barring unforeseen errors, such as a divide-by-zero error). Therefore, any of the predicted instructions 254b, 254a, 254 or the next instruction 252 may be predicted with absolute confidence and it may be assumed that they will always need to be pre-fetched. Conversely, if an unresolved branch has been encountered, the predicted instructions 254b, 254a, 254, and the next instruction 252 may all be speculative in nature and the IPFU 320 may act accordingly, as described below.

In another embodiment, the confidence levels 354b, 354a, 354, and 352 indicates a number of branch instructions that have been unresolved in the stream of instructions. For example, if no unresolved branch instructions are encountered, an issued predicted instruction 254 may be associated with a confidence level 354 of zero (where a lower value indicates higher confidence). As soon as a first unresolved branch instruction is encountered, the confidence level 354 may be increased to one. The predicted instruction 254 predicted between the first unresolved branch instruction and a second unresolved branch instruction may also be associated with a confidence level of one, as the BPU 312 will be no more right or wrong about those predicted instructions as it was about the first branch instruction that started this fork or branch of the instruction stream. However, when a second unresolved branch instruction is encountered, the confidence level 354 may increase to two, and all subsequent instructions (unless a third unresolved branch instruction is encountered) may be marked with a two value. The two value indicating that those instructions are doubly speculative and based upon two levels of guessing.

In yet another embodiment, the confidence level (e.g., confidence level 354) indicates an internal state of the BPU 312's state machine or counter. In various embodiments, a BPU 312 may base its predictions off of an internal state machine (not shown). In some embodiments, a four-state state machine is employed, having states such as, for example: strongly not-taken, weakly not-taken, weakly taken, and strongly taken. In such an embodiment, information about the state (e.g., the "strongly" or "weakly" aspects) may be included in the confidence level (e.g., confidence level 354). It is understood that the above are merely a few illustrative examples to which the disclosed subject matter is not limited.

In the illustrated embodiment, each confidence level 354b, 354a, 354, and 352 may be stored within the BPAQ 314 alongside the respective predicted instructions 254b, 254a, 254, and the next instruction 252. In the illustrated embodiment, the next instruction 252 is associated with the confidence level 352; the predicted instruction 254 is associated with the confidence level 354; the predicted instruction 254a is associated with the confidence level 352a; and the predicted instruction 254b is associated with the confidence level 352b. However, in other embodiments, the BPAQ 314 may not store the confidence levels 354b, 354a, 354, and 352 such that the IPFU 320 only uses a confidence level associated with a most recent predicted instruction (e.g., the confidence level 354b associated with the predicted instruction 254b).

In such an embodiment, the IPFU 320 receives the confidence level 352 along with the predicted instruction address (e.g., the confidence level 354 associated with the predicted instruction address 254). In the illustrated embodiment, the IPFU 320 may be configured to take the confidence level 342b into account when determining to pre-fetch the predicted instruction 254b or throttle any pre-fetching. In the illustrated embodiment, the IPFU 320 may include or store a confidence level threshold 366. In such an embodiment, if the confidence level 354b (in the case of predicted instruction 254b) is greater than the confidence level threshold 366, the pre-fetching may be stopped or throttled. Whereas predicted instructions 254b with confidence levels 354b below the confidence level threshold 366 may be pre-fetched.

In some embodiments, the IPFU 320 may base the pre-fetching decision upon the difference in the confidence level 352 of the next instruction 252 versus the confidence level 354b of the most recent predicted instruction 245b. In such an embodiment, the threshold 366 may be compared against a relative confidence level and not an absolute value. That is to say the confidence level relationship or differential between the next instruction 252 and the predicted instruction 254b may be determinant on the pre-fetching decision. It is understood that the above is merely one illustrative example to which the disclosed subject matter is not limited.

In yet another embodiment, the IPFU 320 may also employ the VIC 256, as described above. For example, if BPU 312 generates a large number of predicted instructions 254 that it is highly confident about, but the IFU 216 is fetching only a small number of the next instructions 252, the depth of the BPAQ 314 becomes relatively great. As a result, an embodiment of the IPFU 320 that makes pre-fetching decisions based entirely on the confidence level 354 may pre-fetch so many predicted instructions 254 that the cache memory becomes full or polluted. When the IFU 216 finally gets around to fetching the next instruction 252 the cache memory may have evicted it in favor of a later predicted instruction (e.g., predicted instruction 254b), thus negating the desired benefits of pre-fetching.

In such an embodiment, a multi-criteria IPFU 320 may be employed. The IPFU 320 may be configured to take into account the confidence level 354, but also the VIC 256. If either value 352 or 256 exceeds its respective threshold 366 or 266, the IPFU 320 may throttle the pre-fetching operation. In such an embodiment, the IPFU 320 may be configured to pre-fetch predicted instructions 254 that are not very speculative, and also not flood the cache with instructions 254 that are not yet requested by the IFU 216. It is understood that the above are merely a few illustrative examples to which the disclosed subject matter is not limited.

It is understood that the above are merely a few illustrative examples to which the disclosed subject matter is not limited. In other embodiments, various other schemes may be employed by the embodiment's IFPU to determine if a predicted instruction should be pre-fetched. The disclosed subject matter is not limited to the embodiments discussed in relation to FIG. 2 or 3.

Figure 4:
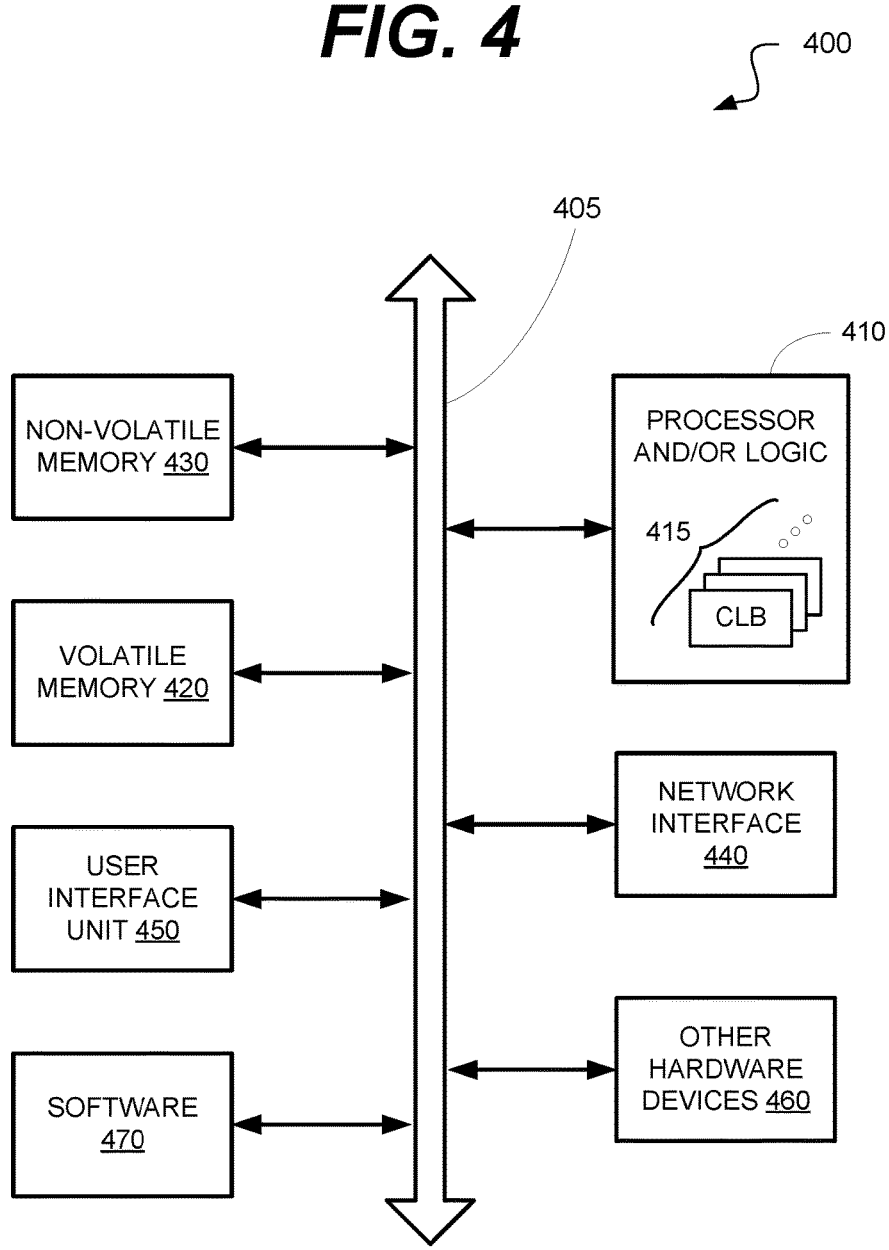
FIG. 4 is a schematic block diagram of an information processing system that may include devices formed according to principles of the disclosed subject matter.

FIG. 4 is a schematic block diagram of an information processing system 400, which may include semiconductor devices formed according to principles of the disclosed subject matter.

Referring to FIG. 4, an information processing system 400 may include one or more of devices constructed according to the principles of the disclosed subject matter. In another embodiment, the information processing system 400 may employ or execute one or more techniques according to the principles of the disclosed subject matter.

In various embodiments, the information processing system 400 may include a computing device, such as, for example, a laptop, desktop, workstation, server, blade server, personal digital assistant, smartphone, tablet, and other appropriate computers, and so on or a virtual machine or virtual computing device thereof. In various embodiments, the information processing system 400 may be used by a user (not shown).

The information processing system 400 according to the disclosed subject matter may further include a central processing unit (CPU), logic, or processor 410. In some embodiments, the processor 410 may include one or more functional unit blocks (FUBs) or combinational logic blocks (CLBs) 415. In such an embodiment, a combinational logic block may include various Boolean logic operations (e.g., NAND, NOR, NOT, XOR, and so on), stabilizing logic devices (e.g., flip-flops, latches, and so on), other logic devices, or a combination thereof. These combinational logic operations may be configured in simple or complex fashion to process input signals to achieve a desired result. It is understood that while a few illustrative examples of synchronous combinational logic operations are described, the disclosed subject matter is not so limited and may include asynchronous operations, or a mixture thereof. In one embodiment, the combinational logic operations may comprise a plurality of complementary metal oxide semiconductors (CMOS) transistors. In various embodiments, these CMOS transistors may be arranged into gates that perform the logical operations; although it is understood that other technologies may be used and are within the scope of the disclosed subject matter.

The information processing system 400 according to the disclosed subject matter may further include a volatile memory 420 (e.g., a Random Access Memory (RAM), and so on). The information processing system 400 according to the disclosed subject matter may further include a non-volatile memory 430 (e.g., a hard drive, an optical memory, a NAND or Flash memory, and so on). In some embodiments, either the volatile memory 420, the non-volatile memory 430, or a combination or portions thereof may be referred to as a "storage medium". In various embodiments, the volatile memory 420 and/or the non-volatile memory 430 may be configured to store data in a semi-permanent or substantially permanent form.

In various embodiments, the information processing system 400 may include one or more network interfaces 440 configured to allow the information processing system 400 to be part of and communicate via a communications network. Examples of a Wi-Fi protocol may include, but are not limited to, Institute of Electrical and Electronics Engineers (IEEE) 802.11g, IEEE 802.11n, and so on. Examples of a cellular protocol may include, but are not limited to: IEEE 802.16m (a.k.a. Wireless-MAN (Metropolitan Area Network) Advanced), Long Term Evolution (LTE) Advanced), Enhanced Data rates for GSM (Global System for Mobile Communications) Evolution (EDGE), Evolved High-Speed Packet Access (HSPA+), and so on. Examples of a wired protocol may include, but are not limited to, IEEE 802.3 (a.k.a. Ethernet), Fibre Channel, Power Line communication (e.g., HomePlug, IEEE 1901, and so on), and so on.

It is understood that the above are merely a few illustrative examples to which the disclosed subject matter is not limited.

The information processing system 400 according to the disclosed subject matter may further include a user interface unit 450 (e.g., a display adapter, a haptic interface, a human interface device, and so on). In various embodiments, this user interface unit 450 may be configured to either receive input from a user and/or provide output to a user. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

In various embodiments, the information processing system 400 may include one or more other devices or hardware components 460 (e.g., a display or monitor, a keyboard, a mouse, a camera, a fingerprint reader, a video processor, and so on). It is understood that the above are merely a few illustrative examples to which the disclosed subject matter is not limited.

The information processing system 400 according to the disclosed subject matter may further include one or more system buses 405. In such an embodiment, the system bus 405 may be configured to communicatively couple the processor 410, the volatile memory 420, the non-volatile memory 430, the network interface 440, the user interface unit 450, and one or more hardware components 460. Data processed by the processor 410 or data inputted from outside of the non-volatile memory 430 may be stored in either the non-volatile memory 430 or the volatile memory 420.

In various embodiments, the information processing system 400 may include or execute one or more software components 470. In some embodiments, the software components 470 may include an operating system (OS) and/or an application. In some embodiments, the OS may be configured to provide one or more services to an application and manage or act as an intermediary between the application and the various hardware components (e.g., the processor 410, a network interface 440, and so on) of the information processing system 400. In such an embodiment, the information processing system 400 may include one or more native applications, which may be installed locally (e.g., within the non-volatile memory 430, and so on) and configured to be executed directly by the processor 410 and directly interact with the OS. In such an embodiment, the native applications may include pre-compiled machine executable code. In some embodiments, the native applications may include a script interpreter (e.g., C shell (csh), AppleScript, AutoHotkey, and so on) or a virtual execution machine (VM) (e.g., the Java Virtual Machine, the Microsoft Common Language Runtime, and so on) that are configured to translate source or object code into executable code which is then executed by the processor 410.

The semiconductor devices described above may be encapsulated using various packaging techniques. For example, semiconductor devices constructed according to principles of the disclosed subject matter may be encapsulated using any one of a package on package (POP) technique, a ball grid arrays (BGAs) technique, a chip scale packages (CSPs) technique, a plastic leaded chip carrier (PLCC) technique, a plastic dual in-line package (PDIP) technique, a die in waffle pack technique, a die in wafer form technique, a chip on board (COB) technique, a ceramic dual in-line package (CERDIP) technique, a plastic metric quad flat package (PMQFP) technique, a plastic quad flat package (PQFP) technique, a small outline package (SOIC) technique, a shrink small outline package (SSOP) technique, a thin small outline package (TSOP) technique, a thin quad flat package (TQFP) technique, a system in package (SIP) technique, a multi-chip package (MCP) technique, a wafer-level fabricated package (WFP) technique, a wafer-level processed stack package (WSP) technique, or other technique as will be known to those skilled in the art.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

In various embodiments, a computer readable medium may include instructions that, when executed, cause a device to perform at least a portion of the method steps. In some embodiments, the computer readable medium may be included in a magnetic medium, optical medium, other medium, or a combination thereof (e.g., CD-ROM, hard drive, a read-only memory, a flash drive, and so on). In such an embodiment, the computer readable medium may be a tangibly and non-transitorily embodied article of manufacture.

While the principles of the disclosed subject matter have been described with reference to example embodiments, it will be apparent to those skilled in the art that various changes and modifications may be made thereto without departing from the spirit and scope of these disclosed concepts. Therefore, it should be understood that the above embodiments are not limiting, but are illustrative only. Thus, the scope of the disclosed concepts are to be determined by the broadest permissible interpretation of the following claims and their equivalents, and should not be restricted or limited by the foregoing description. It is, therefore, to be understood that the appended claims are intended to cover all such modifications and changes as fall within the scope of the embodiments.

What is claimed is:

1. An apparatus comprising:
a branch prediction unit configured to output a current predicted instruction to both a branch prediction queue and a pre-fetcher circuit;
the branch prediction queue configured to store one or more predicted instructions, and decouple the branch prediction unit from a fetch unit, wherein the current predicted instruction is placed as a tail of the branch prediction queue and a next instruction is at a head of the branch prediction queue;
the fetch unit configured to fetch the next instruction, provided from the branch prediction queue, from a cache memory; and
the pre-fetcher circuit configured to pre-fetch the current predicted instruction into the cache memory based, at least in part, upon a relationship between the current predicted instruction and the next instruction, wherein the relationship is provided to the pre-fetcher circuit by the branch prediction queue.

2. The apparatus of claim 1, wherein the pre-fetcher circuit is configured to throttle pre-fetching if the relationship between the current predicted instruction and the next instruction does not meet a predefined criteria.

3. The apparatus of claim 1, wherein the branch prediction queue outputs a valid instruction count to the pre-fetcher circuit, and wherein the valid instruction count indicates the relationship and the number of instructions in the branch prediction queue between the current predicted instruction and the next instruction.

4. The apparatus of claim 1, wherein the pre-fetcher circuit is configured to pre-fetch the current predicted instruction if a number of predicted instructions between the current predicted instruction and the next instruction does not exceed a threshold value.

5. The apparatus of claim 1, wherein the relationship between the current predicted instruction and the next instruction indicates a level of speculation employed by the branch prediction unit.

6. The apparatus of claim 1, wherein the branch prediction unit supplies the pre-fetcher circuit with a memory address of the current predicted instruction.

7. The apparatus of claim 1, wherein the branch prediction unit indicates, with the current predicted instruction, a confidence level that the branch prediction unit has that the current predicted instruction will be executed by the apparatus; and
wherein the pre-fetcher circuit is configured to pre-fetch the current predicted instruction if the confidence level is at or above a threshold value, and refrain from pre-fetching the current predicted instruction if the confidence level is below the threshold value.

8. A method comprising:
predicting, by a prediction circuit, that a current predicted instruction will be executed by a processor;
enqueuing the current predicted instruction in a queue, wherein the queue decouples the prediction circuit from a fetching circuit, wherein the current predicted instruction is placed as a tail of the queue and a next instruction is at a head of the queue;
fetching, from a cache memory and by a fetching circuit, the next instruction as provided from the queue a cache memory;
determining if a relationship between the current predicted instruction and the next instruction meets a set of one or more predefined criteria; and
if so, pre-fetching the current predicted instruction into the cache memory.

9. The method of claim 8, further comprising, if the relationship between the current predicted instruction and the next instruction does not meet the set of one or more predefined criteria, throttling the pre-fetching of the current predicted instruction into the cache memory.

10. The method of claim 8, wherein determining the relationship comprises:
receiving, by a pre-fetch circuit, a valid instruction count from the queue, wherein the valid instruction count indicates a number of enqueued instructions between the current predicted instruction and the next instruction.

11. The method of claim 8, wherein determining the relationship comprises determining if a number of predicted instructions between the current predicted instruction and the next instruction exceeds a threshold value.

12. The method of claim 8, wherein determining the relationship comprises determining a level of speculation involved when predicting the current predicted instruction.

13. The method of claim 8, wherein pre-fetching the current predicted instruction comprises receiving a memory address of the current predicted instruction from the prediction circuit.

14. An apparatus comprising:
a processor configured to execute instructions;

a cache memory configured to temporarily store instructions;

a branch prediction unit configured to output a current predicted instruction to both a branch prediction queue and a pre-fetcher circuit, wherein the current predicted instruction is speculatively predicted to be executed by the processor, and wherein the branch prediction unit is decoupled from a fetch unit;

the branch prediction queue configured to store one or more predicted instructions, wherein the current predicted instruction is placed as a tail of the branch prediction queue and a next instruction is at a head of the branch prediction queue;

the fetch unit configured to fetch the next instruction, provided by the branch prediction queue, from a cache memory; and the pre-fetcher circuit configured to, at least partially in response to a relationship between the current predicted instruction and the next instruction meeting one or more predefined criteria which are defined by the branch prediction queue, pre-fetch the current predicted instruction into the cache memory.

15. The apparatus of claim 14, wherein the branch prediction queue is configured to decouple the branch prediction unit from the fetch unit.

16. The apparatus of claim 14, wherein the branch prediction queue outputs a valid instruction count to the pre-fetcher circuit; and wherein the pre-fetcher circuit is configured to pre-fetch the current predicted instruction if the valid instruction count does not exceed a threshold value, and refrain from pre-fetching the current predicted instruction if the valid instruction count does exceed the threshold value.

17. The apparatus of claim 14, wherein the relationship between the current predicted instruction and the next instruction indicates a level of speculation employed by the branch prediction unit.

18. The apparatus of claim 14, wherein the branch prediction unit supplies the pre-fetcher circuit with a memory address of the current predicted instruction.

* * * * *